(12) United States Patent
Reichgott et al.

(10) Patent No.: US 7,551,699 B2
(45) Date of Patent: Jun. 23, 2009

(54) METHOD AND APPARATUS FOR CONTROLLING A SMART ANTENNA USING METRICS DERIVED FROM A SINGLE CARRIER DIGITAL SIGNAL

(75) Inventors: Samuel H. Reichgott, Coopersburg, PA (US); Raul A. Casas, Doylestown, PA (US); Samir N. Hulyalkar, Newtown, PA (US); Azzedine Touzni, Doylestown, PA (US); John J. Zygmaniak, Columbus, NJ (US); Andrew E. Youtz, Rocky Hill, NJ (US)

(73) Assignee: ATI Technologies, Inc., Ontario (CA)

( * ) Notice: Subject to any disclaimer, the term of this patent is extended or adjusted under 35 U.S.C. 154(b) by 682 days.

(21) Appl. No.: 10/663,028

(22) Filed: Sep. 15, 2003

(65) Prior Publication Data

US 2004/0248517 A1 Dec. 9, 2004

Related U.S. Application Data

(60) Provisional application No. 60/475,736, filed on Jun. 4, 2003.

(51) Int. Cl.
*H04B 1/10* (2006.01)
(52) U.S. Cl. ..................................... 375/347
(58) Field of Classification Search ................ 375/256, 375/259, 347, 349, 350; 455/63.4, 25, 445, 455/277.1, 561, 522; 342/359; 370/208, 370/210
See application file for complete search history.

(56) References Cited

U.S. PATENT DOCUMENTS 4,433,344 A 2/1984 Gradin et al.

(Continued)

FOREIGN PATENT DOCUMENTS

EP 0 289 384 A1 11/1988

(Continued)

OTHER PUBLICATIONS

International Search Report Apr. 18, 2006.

(Continued)

*Primary Examiner*—Don N Vo
(74) *Attorney, Agent, or Firm*—RatnerPrestia

(57) ABSTRACT

A method for selecting an antenna direction setting for optimum signal reception prior to channel equalization provides a set of metrics, referred to as channel quality metrics (CQM), that characterize the quality of the received signal for a given antenna setting and a generic algorithm that uses these metrics to select the antenna setting for an optimum reception. This invention utilizes five main CQMs: a Signal Strength Metric (SSM), a minimum mean squared error of a decision feedback equalizer (MMSE (DFE)) channel quality metric, a MMSE for a linear equalizer (MMSE(LE)) channel quality metric, a Spectral Flatness Metric (SFM) and an interference degradation metric (IDM).

23 Claims, 6 Drawing Sheets

U.S. PATENT DOCUMENTS

| | | | |
|---|---|---|---|
| 6,009,307 A * | 12/1999 | Granata et al. | 455/13.3 |
| 6,031,882 A | 2/2000 | Enge et al. | |
| 6,052,605 A * | 4/2000 | Meredith et al. | 455/561 |
| 6,337,658 B1 * | 1/2002 | Tong et al. | 342/359 |
| 6,466,912 B1 * | 10/2002 | Johnston | 704/500 |
| 6,542,560 B1 | 4/2003 | Buehrer et al. | |
| 6,574,460 B1 * | 6/2003 | Lindenmeier et al. | 455/277.1 |
| 6,690,723 B1 * | 2/2004 | Gosse et al. | 375/233 |
| 6,807,227 B2 * | 10/2004 | Chien | 375/224 |
| 2002/0165002 A1 * | 11/2002 | Kolinko et al. | 455/500 |
| 2003/0053412 A1 * | 3/2003 | Yoshida et al. | 370/208 |
| 2003/0095508 A1 * | 5/2003 | Kadous et al. | 370/252 |
| 2004/0053634 A1 * | 3/2004 | Gainey et al. | 455/522 |
| 2005/0157684 A1 * | 7/2005 | Ylitalo et al. | 370/334 |
| 2007/0123263 A1 * | 5/2007 | Smith et al. | 455/445 |

FOREIGN PATENT DOCUMENTS

JP    2002107439    4/2002

OTHER PUBLICATIONS

Monisha Ghosh, Blind Decision Feedback Equalization for Terrestrial Television Receivers, Proceedings of the IEEE, vol. 86, No. 10, Oct. 1998, pp. 2070-2081.

William F. Gabriel, Adaptive Processing Array Systems, Proceedings of the IEEE, vol. 80, No. 1, Jan. 1992, pp. 152-162.

H. Liu et al., Blind Equalization in Antenna Array CDMA Systems, IEEE Transactions on Signal Processing, vol. 45, No. 1, Jan. 1997, pp. 161-172.

H. Krim et al., Two Decades of Array Signal Processing Research, IEEE Signal Processing Magazine, Jul. 1996, pp. 67-94.

R. Kohno et al., Spatial and Temporal Communication Theory Using Adaptive Array, IEEE Personal Communications, vol. 5, No. 1, Feb. 1998, pp. 28-35.

B. Widrow et al., Adaptive Antenna Systems, Proceedings of the IEEE, vol. 55, No. 12, Dec. 1967, pp. 2143-2159.

* cited by examiner

METHOD AND APPARATUS FOR CONTROLLING A SMART ANTENNA USING METRICS DERIVED FROM A SINGLE CARRIER DIGITAL SIGNAL

CROSS-REFERENCE TO RELATED APPLICATIONS

This application claims the benefit of U.S. Provisional Application No. 60/475,736, filed Jun. 4, 2003, the contents of which are incorporated herein by reference.

FIELD OF THE INVENTION

The present invention relates to the optimum control of an electronically steerable antenna receiving a single carrier broadband digital signal. In particular, the present invention relates to the control of a smart antenna receiving high definition television (HDTV) signal such as that adopted by the U.S. for terrestrial broadcast transmission (ref. Doc/A53 HDTV standard, Advanced Television Systems Committee 1995). The invention is furthermore compliant with the EIA/CEA-909 antenna interface standard (EIA/CEA-909 Antenna Control Interface, 2002).

BACKGROUND OF THE INVENTION

Reliable reception of single carrier digital TV (DTV) signals using indoor antennae poses a technical challenge. A single reception site may be served by multiple transmitters, at various locations and at various distances from the receiver. Topology, including terrain and buildings, create multiple paths that each transmitted signal may take from transmitter to receiver, resulting in an impairment phenomenon known as "multipath interference." The receiver must discriminate among multiple time and phase shifted versions of the same transmitted signal. Reception is usually the best when it is possible to point a receiver's antenna in a direction that receives the strongest signal, with the least multipath interference. In addition, an antenna may have variable gain or other controllable settings that may be used to optimize signal reception.

One solution offered by current technology to solve the problem of indoor reception is the omni-directional antenna. Unfortunately, these antennae tend to exhibit fairly low gain, and tend to exacerbate multipath problems.

A high-gain directional antenna is preferable, but, because signals for different channels come from different directions, it may be desirable that its direction be changed, at least for different TV channels whose transmitters are not co-located. It is unreasonable to expect a consumer, using a remote-control to change channels, to manually change the direction of an antenna just to be able to receive a new channel.

Multiple directional antennae may be combined, with each antenna pointing in a different direction. For example, four antennae may be oriented at 90 degree rotational offsets. The signals from these multiple antennae may be switched, and combined, in order to affect a multi-directional system. For example, if the antenna pointing North and the antenna pointing East are both switched on with equal gain, an effect is created similar to having a single antenna pointing Northeast. The relative gain of adjacent antennae may be controlled to effect a multidirectional antenna. For most reception cases, this is adequate resolution to provide a signal with good signal strength and multipath characteristics, if such a signal is available at all.

The challenge is to develop a system for selecting the proper antenna or combination of antennae, with the proper gain, to give the best TV reception. Another requirement of such a system is that it operate automatically and quickly, so the experience of remote-control channel surfing is not disrupted significantly.

In a multiple-antenna system, the selection of one or more antennae at a given time for reception shall be referred to as an "antenna setting." One approach may be to try every possible setting, and attempt reception. Any setting that does not give a receivable signal is eliminated immediately. If a receivable signal is found, some quality metric in the demodulator, such as the equalizer signal-to-noise ratio (SNR), may be measured, and the setting giving the best SNR would be selected. While this satisfies the requirement for automatic control, it cannot provide a decision quickly enough for a commercial product.

A much faster method may be to simply measure the signal strength at each setting, and select the setting with the strongest signal. Although this solution works well in many cases, it is not reliable. Empirical evidence shows that the effects of multipath can cause in-phase reflections to add together and appear as a stronger signal than one from the optimal antenna selection. In some cases it is better to direct the antennae toward a weaker signal with better multipath characteristics.

There is clearly a need for a metric value that can indicate signal quality, not just signal strength, in a very short time. The best metric would be one that approximates the equalizer minimum mean square error that would be measured if the receiver were allowed to complete all processes necessary for full signal reception.

Applications on smart antenna remain sparse, and, for the systems of communication, are often focused on applications that improve reception in a mobile environment such as GPS, cellular phone with CDMA technologies, etc.

Smart antenna problems can be divided into issues related to antenna calibration and issues related to an optimization of direction of arrival and/or minimization of undesirable interference by mean of an array of sensors. Optimization of the antenna directivity may or may not be based on an "adaptive" optimization procedure (i.e., an optimization that would track the changes in the channel characteristics). Traditionally, it is desirable for the process to be adaptive when, for example, the antenna has to track a moving target. For a review an adaptive smart antenna systems one may refer to the articles "Adaptive Antenna Systems," by B. Widrow et al, published in *Proceedings of the IEEE*, vol. 55, No. 12, December 1967, pp. 2143-2159, and "Adaptive Processing Array Systems," by W. F. Gabriel, published in *Proceedings of the IEEE*, vol. 80, No. 1, January 1992, pp. 152-162. The solutions using an adaptive process are often effective in the case of a narrow band signal. For complementary information on this topic one may consult the articles "Two decades of Array Signal Processing Research," by H. Krim and M. Viberg, published in *IEEE Processing Magazine*, July 1996, pp. 67-94, and "Spatial and Temporal Communication Theory Using Adaptive Antenna Array," by R. Kohno published in the *IEEE Personal Communications*, vol. 5, No. 1, February 1998, pp. 28-35.

Optimization of the directivity of an antenna for a wide band signal is generally a more challenging problem, which can often be merged with a channel equalization problem. This is for example the case when a communication system between multiple links involves multipath. Optimization of reception of a signal source can be associated with the suppression of the intersymbol interference coming from one particular channel of transmission. One may consult the article on channel equalization for Code Division Multiple Access (CDMA) systems "Blind Equalization in Antenna Array CDMA Systems," by H. Liu and M. Zoltowski, published in *IEEE Trans. on Signal Processing*, Vol. 45, No. 1, January 1997, pp. 161-172 as an example of smart antenna system using equalization.

SUMMARY OF THE INVENTION

This invention provides means of selecting an antenna setting for optimum signal reception prior to channel equalization. The invention provides a set of metrics, referred to as channel quality metrics (CQM) that characterize the quality of the received signal for a given antenna setting and a generic algorithm that uses these metrics to select the antenna setting for an optimum reception. This invention utilizes five main CQMs:

a) a Signal Strength Metric (SSM), derived from the Automatic Gain Control (AGC) function, b) a MMSE (DFE) channel quality metric. This measure corresponds to the theoretical Minimum Mean Square Error (MMSE) when a Decision Feedback Equalizer (DFE) is used to equalize the channel. The measure can be expressed in the frequency domain or in the time domain. Either approach may be explicitly used in this invention. Furthermore, if required, additional simplifications may be introduced to further reduce computational time.

c) a MMSE(LE) channel quality metric. This measure corresponds to the MMSE when a linear equalizer (LE) is used. The MMSE(LE) may also be used as an upper bound of the MMSE(DFE) metric, d) a Spectral Flatness Metric (SFM), which is a measure of distance between the ideal channel spectrum and a channel spectrum affected by multipath distortion, e) an interference degradation metric (IDM), which is a measure of interference from undesired signals.

DETAILED DESCRIPTION

One element in a DTV receiver according to the subject invention, which is different from prior DTV receivers, is that the equalizer introduced to remove the multipath interference operates on a single signal, which is precisely the signal furnished by the optimum smart antenna. The optimization of the smart antenna uses the assumption that the demodulator applies the best possible equalizer (i.e. the one which provides the minimum bit error rate (BER)) associated with each possible antenna combination and each possible local DTV transmitted channel. In other words, the approach uses a two-step procedure. In a first step, the optimum smart antenna setting is deduced from the assumption that a theoretical optimum post processing equalizer will be applied to the signal, and in a second step the optimum equalizer (or a closed-form solution) is applied to the best received candidate signal. Metrics that confirm the optimum setting are then computed and fed back to the smart antenna device to stabilize the final optimum antenna setting (or slightly adjust it if needed). Practically speaking the interaction between the smart antenna device and the demodulator is accomplished using the EIA/CEA-909 smart control interface standard.

1. Receiver Architecture

Figure 1:
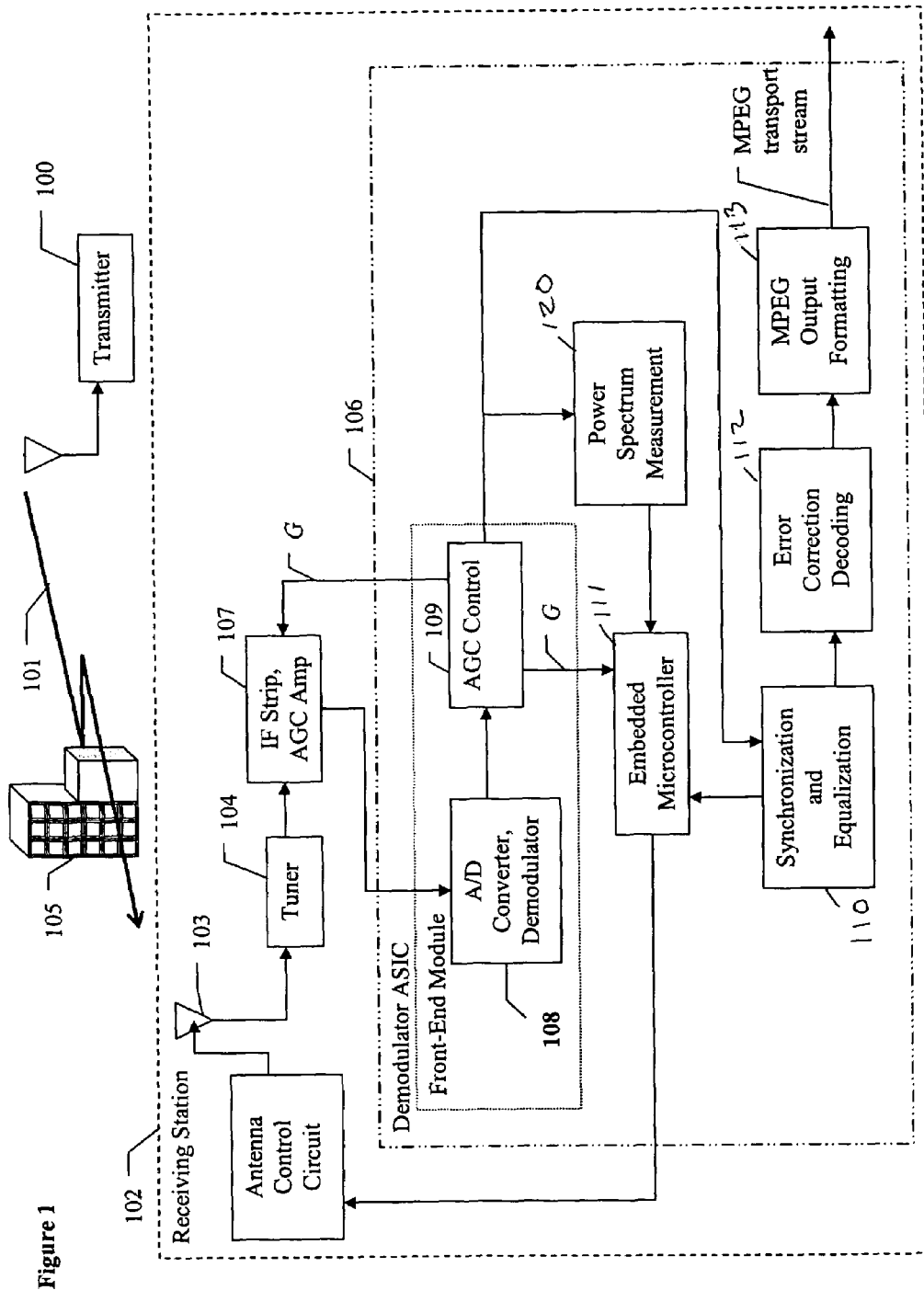
FIG. 1 is a block diagram of a digital communication system employing the metrics and algorithms described by this invention.

FIG. 1 is a block diagram of a digital communications system according to the subject invention. In this system, a single-carrier (e.g. an 8-Vestigial sideband (VSB)) digital communications system a transmitter 100 modulates digitally encoded information onto a signal carrier 101 and propagates it through the air.

In a system with multiple transmitters at different locations, each transmitter's signal may originate with a respectively different power. The signal power reaching a receiver 102 diminishes as its distance from transmitter increases. As the signal propagates it may reflect off a variety of objects such as buildings 105 or other elements of terrain. Signal reflections of the original transmitted signal arrive at the receiver, and are combined additively, with different amounts of time delay, attenuation and phase, and are thus known as multipath interference, or "echoes" of the signal.

At the receiver 102 the transmitted signal encounters an antenna 103, which collects the signal for further processing. Due to the effects of multipath interference, and the different position of each transmitter with respect to the receiving station, different orientations of the antenna may provide different degrees of signal quality for each transmitter in the system. Signal quality may be defined from a variety of metrics, such as signal power, or achievable mean square error (MSE). Some of these metrics are used in this invention to select antenna orientation, and are described below.

Antenna 103 is coupled to tuner 104 which selects the signal of interest at its given carrier radio frequency (RF), or channel, and shifts that RF frequency to a single intermediate frequency (IF) that may be input to the demodulator 106. Prior to being input to the demodulator, the signal is conditioned by the IF amplifier strip (IF Strip) and the automatic gain control (AGC) Amplifier circuit 107. In particular, the AGC Amplifier may either amplify or attenuate the signal such that the input power to the A/D Converter and Demodulator 108 is at a consistent level for sampling, regardless of the signal power received at the antenna. The IF Strip includes anti-aliasing filters that are used to remove aliasing distortion from the sampled signal and that are useful for attenuation of interfering adjacent signals.

The AGC Amplifier is controlled in a closed-loop fashion by the AGC Control circuit 109. The AGC Control circuit measures the power being received at the A/D Converter, and delivers an AGC Gain Control signal G to the AGC Amplifier in order to maintain the measured power at a desired target level. Increasing signal power results in decreased gain, while decreasing signal power results in increased gain.

A/D Converter and Demodulator 108 samples the IF signal and typically shifts the IF carrier frequency to near baseband, where a residual carrier offset may remain from imprecisions in the cascade processing apparatus. The A/D Converter and Demodulator block 108 is coupled to the Synchronization and Equalization block 110 via the embedded microcontroller 111. The synchronization process removes the residual carrier offset via carrier recovery and resamples the signal to (an integer multiple of) the transmitted symbol rate via timing recovery. The equalization process filters the precise baseband, baud (or a fraction of baud) samples and roughly "inverts" multipath interference, effectively resulting in a single path channel from transmitter to the output of the Equalizer. One exemplary signal quality metric is the average squared difference between Equalizer symbol estimates and transmitted symbols, known as Equalizer (symbol estimate) mean square error (MSE), which yields an accurate indication of the ultimate system performance metric, the bit error rate. (In this case it is assumed that the MSE has a Gaussian distribution).

The symbol estimates at the output port of the Synchronization and Equalization block 110 are sent to the Error Correction Decoding block 112. The error correction and decoding block detects and corrects errors introduced by interference in the system by reversing the channel coding of source bits performed at Transmitter 100. Finally source bit estimates are packaged by Output Formatter 113 as the final product of Receiver 102.

2. Signal Strength Metric

As described above, different antenna orientations may produce different measures of signal quality. One measure of signal quality is signal power. A received signal with higher power has higher immunity to thermal noise introduced by components in the IF Strip and by imprecisions in the processing chain. Received signal power is (roughly) inversely proportional to AGC gain, which can be accessed by Embedded Microcontroller 111. The Microcontroller reads a value G from the AGC Control circuit 109 that indicates the amount of gain being applied by the AGC Amplifier. The inverse relationship between signal power and gain allows the value G to be used to derive a metric representing signal power. A simple metric, referred to as Signal Strength Metric (SSM), is defined by equation (1)

$$\text{Signal Strength} = 100 \times \left(1 - \frac{G}{G_{max}}\right) \tag{1}$$

where $G_{max}$ is the value of G that represents the maximum possible gain of the AGC Amplifier. Signal Strength is interpreted as a "signal power percentage." Note that in practice, this metric is not necessarily directly proportional to signal power, or even linearly related. It is assumed, however, that the relation is known and thus signal power can be derived from AGC gain.

Figure 2:
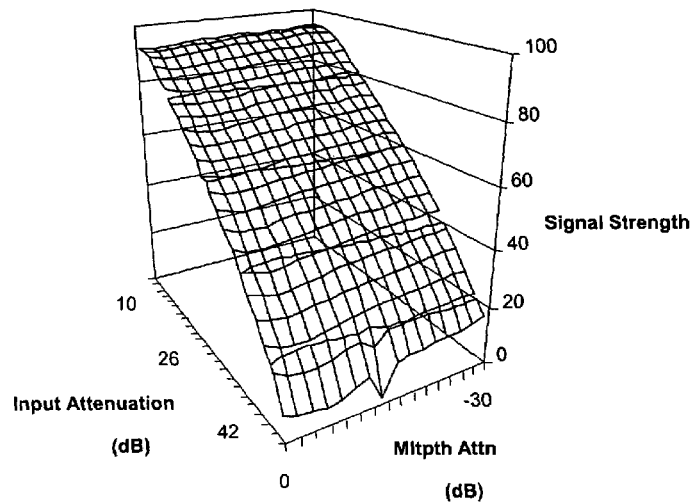
FIG. 2 is a description of the signal strength metric (Signal strength vs. Attenuation vs. Multipath).

FIG. 2 shows signal strength derived from AGC gain readings in an ATSC receiver. In one axis the signal is attenuated from a very strong at one end, down to a signal at the threshold of visibility (TOV) level at which visual distortions are seen the DTV video. In the other axis the amount of multipath interference from a 0.1 μsec delay echo is attenuated from very strong interference, equal in power to the direct path, to virtually no interference.

The significant characteristic of this plot is that the signal strength measurement could be quasi-independent of the amount of multipath interference. Depending on the nature of the multipath interference, similar plots may actually show increasing signal strength in cases of worse interference. While signal strength is very important to quality reception, it is an insufficient measure to be used for antenna selection. This is explained in the next section.

3. Frequency Domain Channel Quality Metrics (MMSE-DFE)

3.1 MMSE-DFE Criterion

As described above, the Equalizer MSE provides an accurate measure of system performance in terms of bit error rate, and thus, is a highly desirable signal quality metric. The Equalizer MSE can truly be determined only by operating the receiver, but this may be prohibitive in terms of the time taken for processing if several antenna configurations are probed. For popular Equalizer receiver structures, such as a Linear Equalizer (LE) or Decision Feedback Equalizer (DFE), however, the minimum achievable MSE, or MMSE may be estimated given a power spectrum measurement of the received signal and an estimate of the noise power. Thus, the MMSE serves as a lower bound for the achievable performance, and as a practical, useful CQM.

The following description, focuses on the architecture of the DFE receiver, because it is the most commonly used architecture in current terrestrial DTV demodulator implementations. (See, for example, a paper by M. Ghosh entitled "Blind Decision Feedback Equalization for Terrestrial Television Receivers" *Proceedings of the IEEE*, vol. 86, no. 10, October 1998). The MMSE for a DFE can be expressed as a function of the channel frequency response and the noise power (under a set of assumptions on the channel, source and noise) as shown in equation (2).

$$MMSE(DFE) = \sigma_s^2 \exp\left(\frac{1}{2\pi}\int_{-\pi}^{\pi} \ln\frac{\lambda}{Q(f)} df\right) \tag{2}$$

where $\lambda = \sigma_n^2/\sigma_s^2$ is the inverse of the signal to noise ratio (SNR), $\sigma_s^2$ is the source signal power, $\sigma_n^2$ is the noise power and $Q(f) = |C(f)|^2 + \lambda$ is the power spectrum of the IF signal normalized by the source signal power.

Because a practical modulator amplifies or attenuates the received signal before it is sampled and processed digitally by the DFE, it is desirable to account for the Automatic Gain Control (AGC) gain G used before the signal is sampled. Rearranging terms and including the effect of the AGC gain results in equation (3).

$$MMSE(DFE) = \sigma_s^2 G \exp\left(\frac{1}{2\pi}\int_{-\pi}^{\pi} \ln\frac{\lambda}{GQ(f)} df\right). \tag{3}$$

This is a more useful expression than equation (2) as the term GQ(f) is the power spectrum of the signal after the IF Strip and AGC block 107 and is thus essentially equivalent to the sampled signal after A/D Converter 108. In contrast, equation (2) estimates the power spectrum of the RF signal received at antenna 103, which is impractical. Alternatively, by calculating a power spectrum estimate of the sampled signal with Power Spectrum Measurement block 120 and by measuring the AGC gain G it is possible to estimate the MMSE achievable by a DFE for a particular channel, and consequently for a particular antenna orientation.

Practical calculation of the MMSE(DFE) metric may be difficult in an embedded microcontroller due to processing power limitations. Note that equation (3) requires division, logarithm and exponentiation functions. Thus, it may be desirable to derive approximations of the MMSE(DFE) function that can be used as substitute signal quality metrics. The first approximation is the MMSE achieved by a linear equalizer, given by equation (4).

$$MMSE(LE) = \sigma_s^2 G \left( \frac{1}{2\pi} \int_{-\pi}^{\pi} \frac{\lambda}{GQ(f)} df \right) \quad (4)$$

Note that MMSE(DFE)≦MMSE(LE).

3.2 MMSE-LE Approximation

Another approximation assumes small variations in Q(f) over frequency. Thus, Q(f) may be approximated by $Q(f)=\overline{Q}+\tilde{Q}(f)$ where $\overline{Q}$ is some constant and $|\tilde{Q}(f)|<<\overline{Q}$. This leads to the approximation given by equation (5).

$$MMSE(LE) \approx \sigma_s^2 G \left( \frac{1}{2\pi} \int_{-\pi}^{\pi} \lambda(\overline{Q} - \tilde{Q}(f)) df \right). \quad (5)$$

This approximation is useful because it does not require divisions, as in Equation (4), which are costly in terms of processing power of the Microcontroller 111.

3.3 MMSE Calculation Algorithm

This section describes a step-by-step procedure for calculating the MMSE quantities defined by equations (3), (4) and (5). The first step is to estimate the scalar quantities as follows:

(I) Scalar Quantities

Signal power $\sigma_s^2$: known from transmitter specifications.

Noise power $\sigma_n^2$: can be estimated from ambient noise power (−106 dBm for UHF/VHF band), from noise figures of components in IF Strip and AGC block 107, and from amount of quantization noise introduced by A/D Converter 108.

AGC gain G: can be extracted from AGC control 109, as described above.

The next step is to estimate the power spectrum GQ(f). Power spectrum calculations and approximations can be done in a variety of ways. The description that follows is just one low-cost method of estimating the power spectrum (II) Power Spectrum Select a set of N frequencies $f_k \in [-\pi, \pi)$ equally spaced by δ. For each frequency $f_k$, the sampled signal r(n) is bandpass filtered at the output port of AGC control 109 at that frequency. A type of bandpass filter typically used for this task is a single pole filter having a transfer function defined by equation (6).

$$B_k(z) = \frac{1}{1 - \alpha e^{j2\pi f_k} z^{-1}}, \; 0 < \alpha < 1 \quad (6)$$

For each frequency $f_k$, the square magnitude of the output signal of the bandpass filter is averaged. This results in an estimate of the power spectrum at that frequency described by equation (7).

$$GQ(f_k) \approx P_k = AVG[|B_k(z)r(n)|^2] \quad (7)$$

(III) MMSE Approximation

Finally, the CQMs may be calculated from the quantities estimated in steps (I) and (II) by approximating the integrals with sums as shown in equations (8), (9) and (10).

The approximation which results from equation (3) is shown in equation (8).

$$MMSE(DFE) \approx \sigma_s^2 G \exp\left( \frac{\delta}{2\pi} \sum_k \ln\left(\frac{\lambda}{P_k}\right) \right) \quad (8)$$

The approximation using equation (4) is shown in equation (9).

$$MMSE(LE) \approx \frac{\sigma_n^2 G \delta}{2\pi} \sum_k \frac{1}{P_k} \quad (9)$$

The approximation resulting from equation (5) is shown in equation (10).

$$MMSE(LE) \approx \frac{\sigma_n^2 G \delta}{2\pi} \sum_k (\overline{P} - \tilde{P}_k), \quad (10)$$

$$\overline{P} = \frac{1}{N} \sum_k P_k, \quad \tilde{P}_k = P_k - \overline{P}$$

Figure 3:
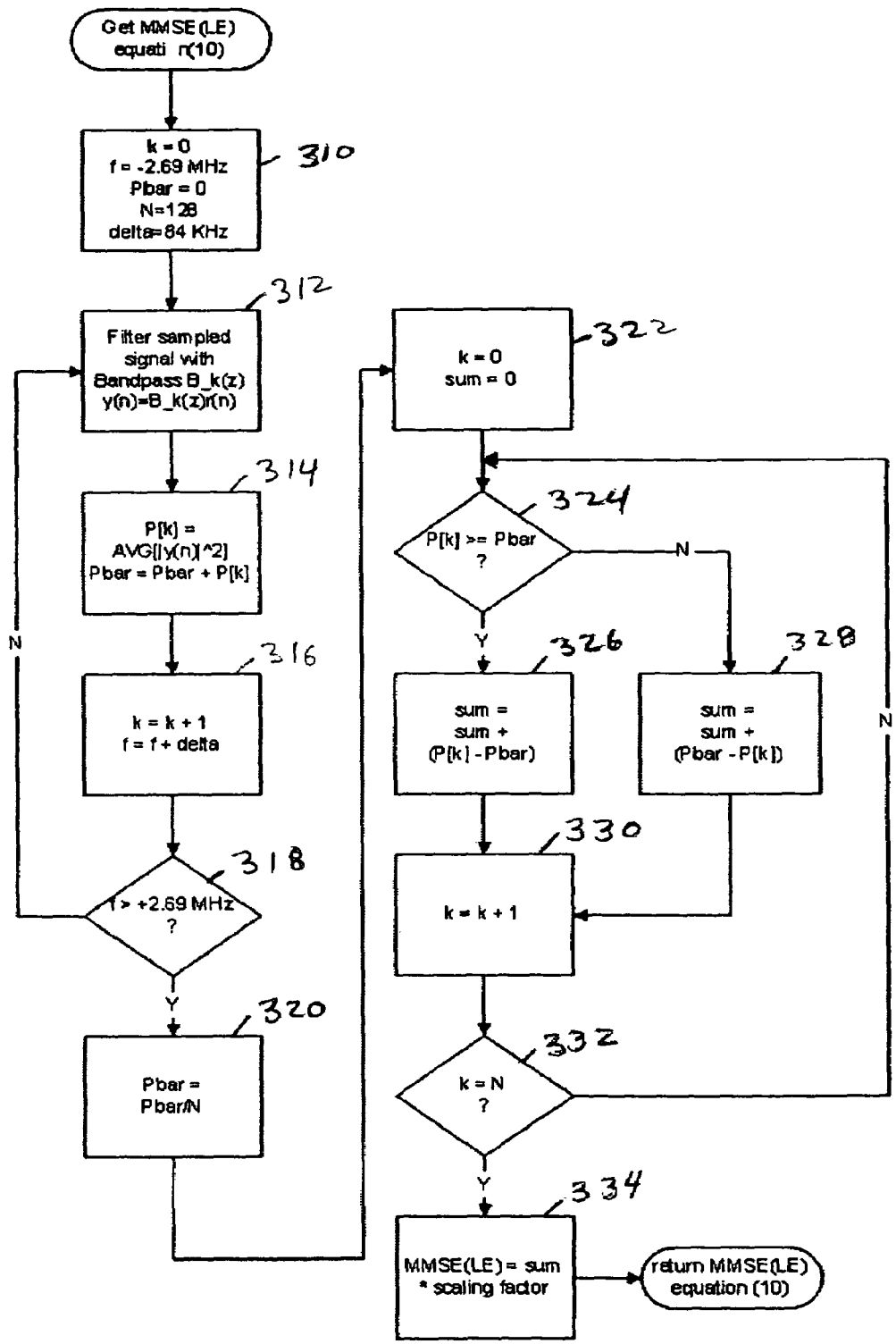
FIG. 3 is a description how microcontroller (110) estimates the MMSE(LE) metric.

An example is described below with reference to FIG. 3 that shows how Microcontroller 110 estimates the MMSE (LE) CQM using equation (10).

In the exemplary implementation, the power spectrum of a sampled IF VSB signal is measured. The exemplary signal has a 10.76 MHz bandwidth at baseband (centered around 0 Hz). Due to the nature of the VSB modulation, the frequency band of interest occupies only half the spectrum, so the power spectrum is estimated over only 5.38 MHz of bandwidth. In this example, the number of bins is set to N=128 so that the step between frequency bins is approximately δ=84 kHz.

Figure 4A:
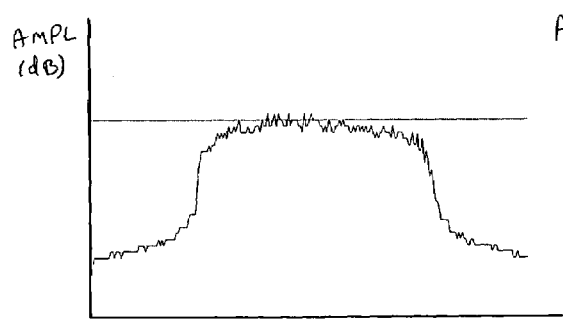
FIGS. 4A and 4B Illustrate a channel spectrum measurement using a BandPass filter.
Figure 4B:
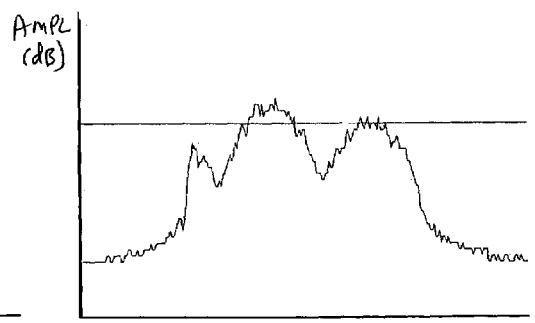

The CQM calculation starts at step 310 at the bottom frequency of interest f=−2.69 MHz, associated with the index k=0. The sampled IF signal is bandpass filtered at step 312 using a filter centered at f=−2.69 MHz, described by equation (6). The average P[k] of the squared magnitude of the filter output is computed and stored as an estimate of the power at that frequency at step 314. Also at step 314, the running sum (Pbar) of all frequency bin power estimates is stored. Next, at step 316, the bandpass filter frequency is incremented by the bin size δ, the index k is incremented, and the procedure is repeated at the next frequency bin. A plot of the resulting calculations P[k] versus k for two types of VSB signals appear in FIGS. 4A and 4B, respectively. FIG. 4A shows a signal with no multipath interference, and FIG. 4B shows the effects of severe multipath interference. Once all frequencies have been covered, as determined at step 318, the average bin power Pbar is normalized by the number of bins N in step 320. Next, at steps 322, 324, 326, 328, 330 and 332, the difference between the power at each bin P[k] and the average power P is taken at each frequency bin k and result is summed together over all frequencies. This sum is normalized at step 334 by a scaling factor to the left of the summation in equation (10). This final quantity is the approximate MMSE(LE).

Figure 5:
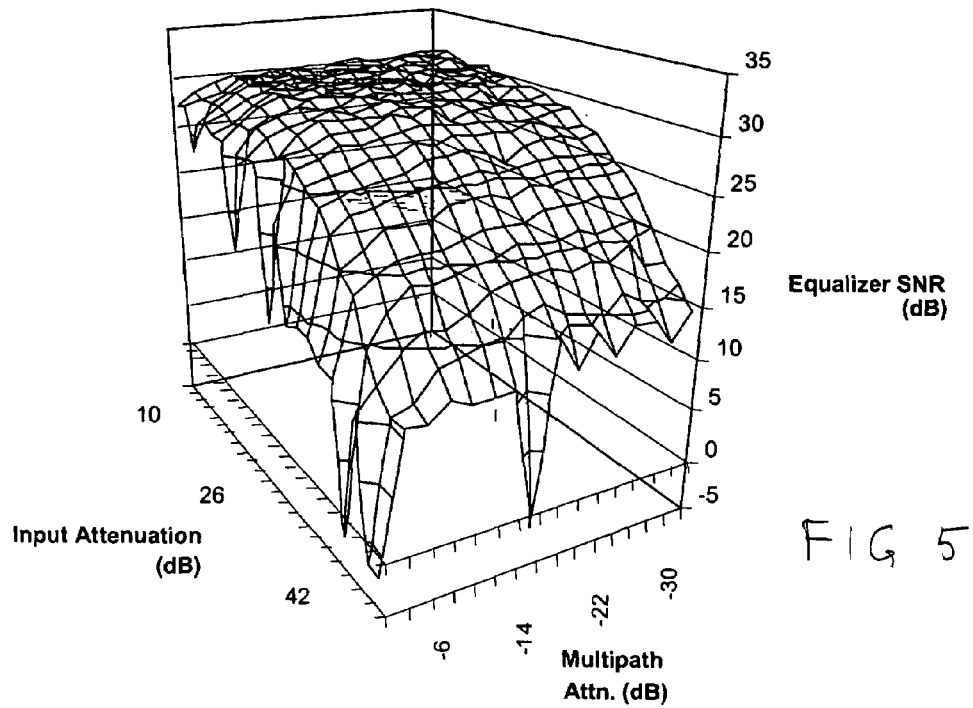
FIG. 5 Illustrates the equalizer SNR vs. attenuation and multipath distortion.
Figure 6A:
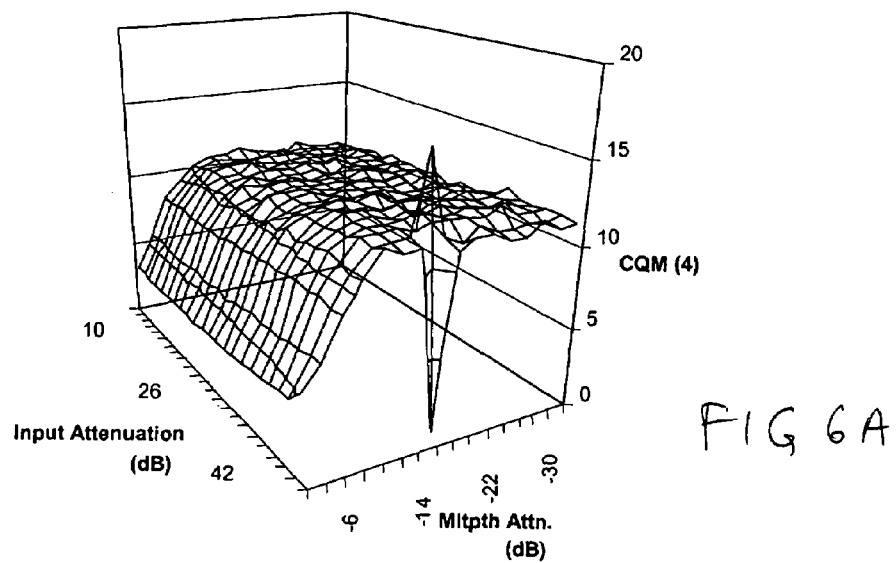
FIG. 6A illustrates the estimated MMSE(DFE) metric in the exemplary implementation, and FIG. 6B Illustrates the MMSE(LE) metric vs. attenuation and multipath distortion.

The plots shown in FIGS. 5 and 6A illustrate the characteristics of MMSE for the exemplary signal shown in FIG. 2. FIG. 5 is a plot of Equalizer signal to noise ratio (SNR) measured from operation of the receiver. In one axis the input signal is attenuated from a relatively high level, down to a level at the threshold of visibility (TOV) for the example system. In the other axis the amount of multipath interference from a 0.1 μsec echo is attenuated from a relatively high level of interference, to virtually no interference.

Figure 6B:
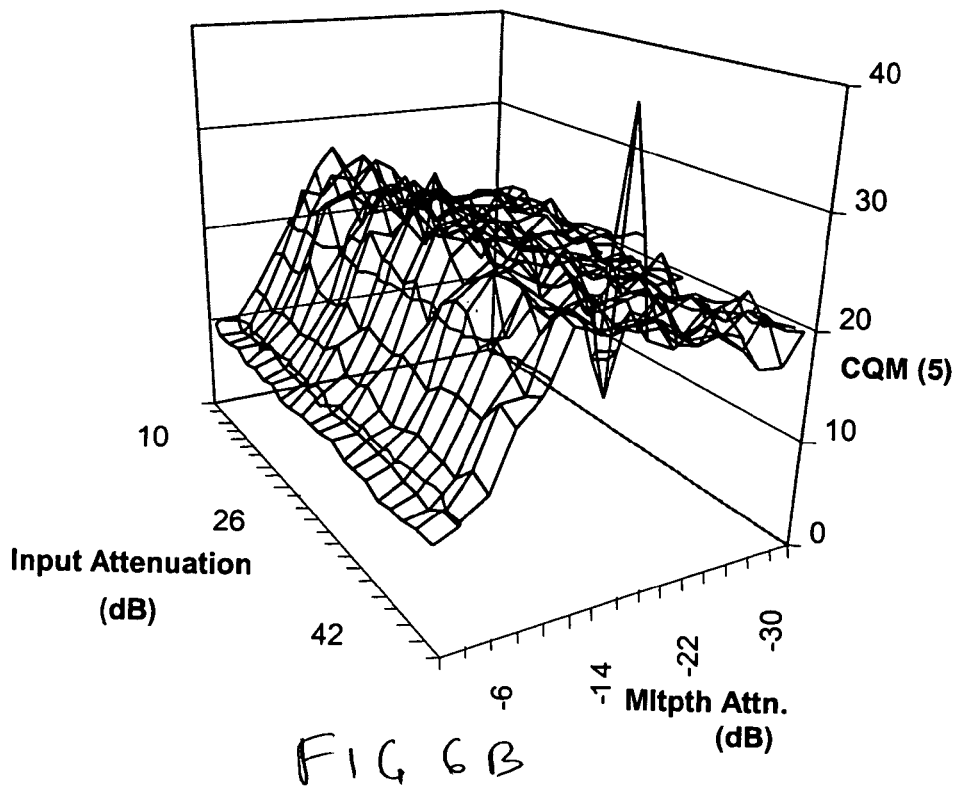

FIGS. 6A and 6(B) are plots of the MMSE using equations (4) and (5), respectively, removing the effect of AGC gain G to emphasize the effect of multipath interference.

4. Time Domain Channel Quality Metrics (MMSE-DFE)

The MMSE-DFE error term can also be expressed in the time domain as a function of the Finite Impulse Response (FIR) channel multipath model and the Auto Regressive (AR) FIR model contribution of the channel as shown in equation (11).

$$MMSE(DFE) = \sigma_s^2 \frac{\sum_k |h_{min_k}|^2}{\lambda \sum_k |h_k|^2 + 1} \quad (11)$$

The coefficient of the filter $h_{min}(z)$ (in the z-domain) are the taps of the Feedback portion of a Decision Feedback Equalizer filter which minimizes the Mean Square Error (MSE) between the equalized received signal and a known reference level of the transmitted symbols. The filter $h_{min}(z)$ is also the minimum phase contribution of the channel multipath model $h(z)$.

The filter $h_{min}(z)$ can also be deduced from a linear prediction based on the received signal (i.e. the base-band signal). This is also referred to as the Minimum Output Energy (MOE) of the received signal. Estimation of the filter $h_{min}(z)$ can be processed in parallel with or prior to the function of channel equalization. In one embodiment of the Decision Feedback Equalizer, the filter $h_{min}(z)$ is estimated using the MOE estimator prior to being used as an initialization filter for the feedback equalizer. This is described in pending U.S. patent application Ser. No. 10/016,665 entitled "Linear Prediction Based Initialization of a Single Axis Blind Equalization for VSB Signals", by R. A. Casas et al.

The denominator of the time domain MMSE-DFE expression may be estimated with a correlation of the received signal. In the context of the 8-VSB ATSC HDTV standard the channel estimation may use a 511 bit pseudo-random (PN511) sequence of symbols to compute the channel estimate. It is noted, however, that the estimator uses an estimation of the noise contribution.

5. Spectral Flatness Channel Quality Metrics

The Spectral Flatness Metric (SFM) is expressed as shown in equation (12).

$$SP = \log\left(\frac{1}{2\pi}\int_{-\pi}^{+\pi} Q'(f)df\right) - \frac{1}{2\pi}\int_{-\pi}^{+\pi} \log Q'(f)df \quad (12)$$

where $Q'(f)=|h_{min}(f)|^2 Q(f)$. The function $Q(f)$ is the power spectrum of the IF signal as described above.

It is noted that $0 \geq SP \geq +\infty$ and $SP=0$ only when $Q'(f)$ is a constant. It is also noted that when $Q'(f)$ is multiplied by a constant the SFM is unchanged. In other words the metric SFM does not use an estimation of the noise. In a preferred embodiment the integral summation introduced in the SFM would be replaced with a discrete summation. If needed the numerical complexity of the SFM can be reduced by replacing the logarithm (log function) with a polynomial approximation or a look up table. The scaling factor $1/(2\lambda)$ (where $\lambda=3.1415\ldots$) can also be replaced in equation (12) by another arbitrary constant of normalization. A person of ordinary skill in the art of digital filtering would also know that the coefficients of $Q'(f)$ can be estimated in the frequency domain or in the time domain.

6. Frequency Domain Interference Degradation Metric

As described above, certain antenna directions may point in the direction of interfering signals (such as signals from an adjacent channel frequency transmitter, or same channel frequency transmitter at a distant location) and away from the desired channel. To reduce the resulting degradation in the received signal, an interference degradation metric (IDM) is proposed which is based on a frequency domain PSD measurement.

For example, it may be desirable to estimate the degradation from an interfering signal or signals at a frequency $f_I$ by deriving an IDM. The following procedure outline how the IDM may be derived:

1) Pick a typical Desired-to-Undesired Ratio (DUR) interference setting $D_T$, measured (in dB) from the PSD of the received data, and record the MSE from the receiver at that setting. This value is called $MSE(D_T)$.
2) Define the "typical interference suppression" of the receiver as $\Delta_T=10\log_{10}(MSE(D_T))+D_T$.
3) For any given interference at frequency $f_I$, estimate the DUR $D_I$ from a PSD of the received data.
4) Estimate the MSE for that interference as shown in equation (13).

$$MSE(D_I) \approx 10^{(\Delta_T - D_I)/10} \quad (13).$$

An alternative approach is to create a lookup table for MSEs given a DUR measured from a PSD of the received data. The table can be created for a typical scenario, such as a clean channel (no multipath or AWGN noise) and co-channel or adjacent channel interference. The estimate of the contribution to MSE from interference given by the IDM can be used in combination with the other metrics described in this patent to select antenna orientation.

7. Antenna Setting Selection Algorithm

Now that CQMs are available for determining the quality of reception of an antenna orientation, they may be used to design an algorithm for selection the antenna setting. The exemplary algorithm uses a two-step process as follows:

Coarse Selection Measure various metrics at each antenna setting (or some subset of all antenna settings), and select a subset of antenna settings (orientations) based on one or a combination of the SSM, frequency and time domain MMSE, SFM, and IDM. This is called the coarse subset.

Fine Selection Measure various metrics for all settings within the coarse subset and select the optimal antenna setting based on one or a combination of CQMs.

A typical embodiment uses four antennae mounted at 90 degree increments (i.e. North, East, South, and West). By selecting the signal from any one antenna, or by combining the signals from any two adjacent antennae, it is possible to create a system with eight position settings. Similarly, by controlling the relative gain of adjacent antennae it is possible to construct a system with 16 position settings as defined in the EIA/CEA 909 standard specification. Furthermore, it is contemplated that more than four fixed antennas may be used or that even finer position settings may be achieved, providing, for example 32 or 64 antenna angle settings by evenly dividing the 360 degrees covered by the antennas. Alternatively, the 360 degree space need not be divided evenly. This may be advantageous, for example, when television signals originate predominantly from one direction. In this instance, multiple antennae may be arrayed at angles generally directed to the television transmitters and reception of signals at angles between the fixed antennas may be achieved by combining signals from adjacent antennas.

Figure 7:
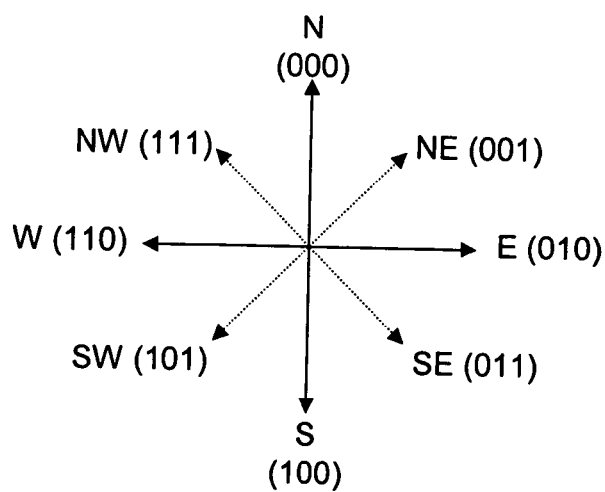
FIG. 7 is an example of multi-antenna system implementation.

An exemplary implementation is depicted in FIG. 7. The numbers at each position indicate a binary control word that is used to select that antenna position.

Figure 8:
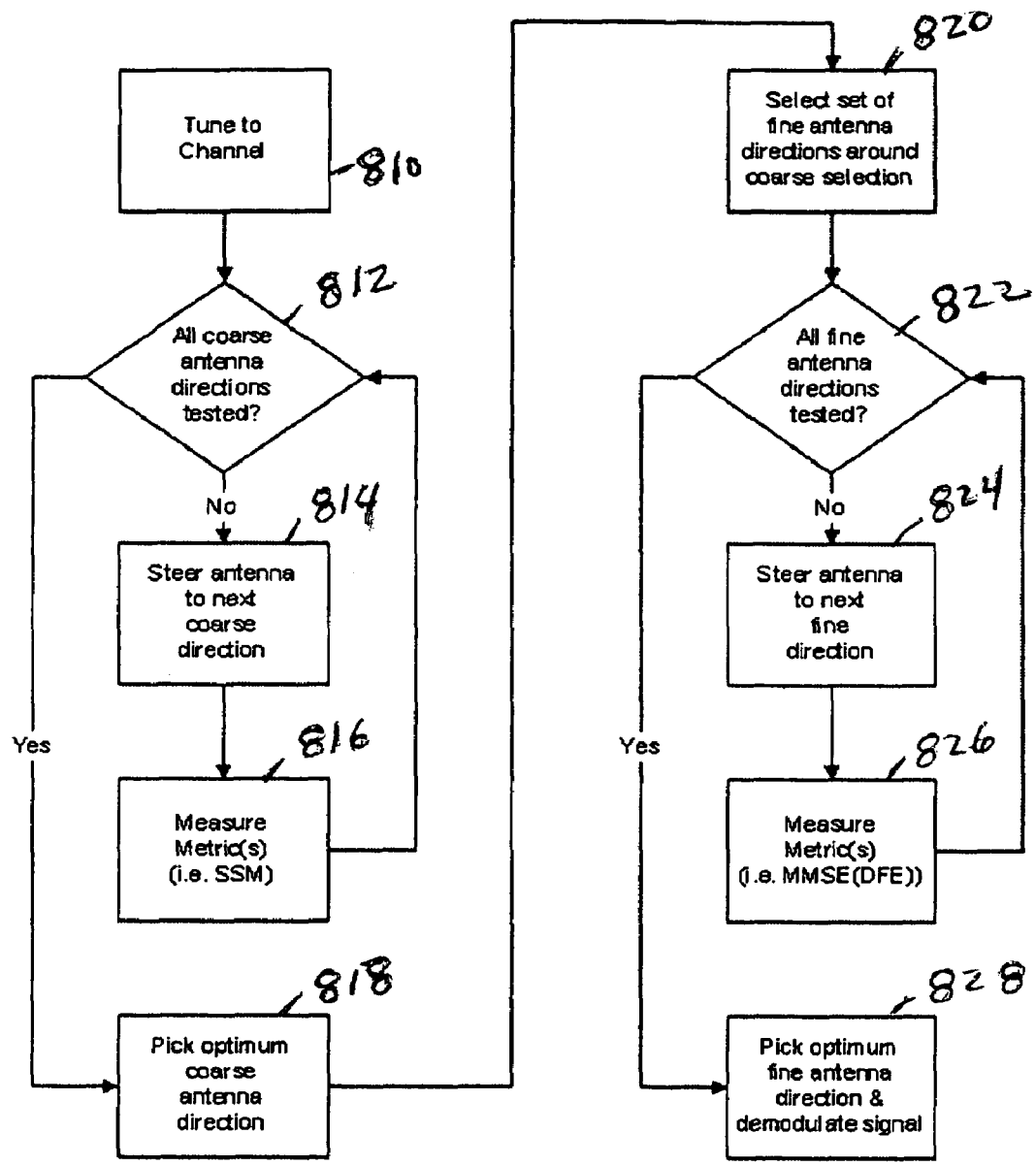
FIG. 8 is the flow chart algorithm for antenna setting selection.

The following example described with reference to FIGS. 7 and 8 illustrates an exemplary antenna selection algorithm. The algorithm shown in FIG. 8 is repeated for each channel in the scan list of the television receiver. The first step in the process, step 810, is to tune the receiver to the desired channel. At step 812, the process determines if all coarse antenna directions (e.g. N, E, S and W) have been tested. If they have, control transfers to step 818, described below. Otherwise, control transfers to step 814 in which the antenna is steered to the next coarse direction. At step 816, the receiver measures a first characteristic of the RF signal received from the current coarse direction. This characteristic may be any one of the metrics described above, for example, the signal strength metric (SSM), a combination of these metrics, or another metric relevant to the quality of the received signal. After step 816, control transfers to step 812 to check the next coarse direction.

At step 818, the process determines which coarse antenna direction produced the best signal, based on the characteristic measured at step 816. In the exemplary system, the SSM is measured at positions N, E, S, and W. In this example, position N gives the highest value, so this is selected the coarse selection in step 818. Next, starting at step 820, the process determines which of the fine antenna directions is to be used as the preferred direction At step 818, the process selects a further set of fine antenna directions that are related to the coarse antenna directions. In the example, the selected directions are northwest (NW), north (N) and northeast (NE). It is contemplated, however that other related directions may be used, for example, north-northeast (NNE) and north-northwest (NNW) may be added to the set of fine antenna directions.

After the set of fine antenna directions have been selected, step 822 is executed which determines if all of the fine directions have been tested. If they have, control transfers to step 828, described below. Otherwise, control transfers to step 824 which steers the antenna to the next fine direction. At step 826, the process measures a characteristic of the received signal, for example, the MMSE(DFE), and transfers control to step 822 to select the next fine direction. At step 828, signal characteristics from all of the fine directions have been measured. In this example, the MMSE(DFE) is measured at positions NW, N, and NE. In this example, position NE gives the best value, so this is the preferred position selected for the best reception. Although the example uses MMSE(DFE), the characteristic measured for the fine antenna directions can be another metric or it can be estimated as a combination metrics. For example it may be measured as a combination of the frequency domain (or time domain) MMSE(DFE) metric (from equation (8)), which gives the contribution to the mean square error from the random noise and multipath interference, and the MSE(DI) (from equation (11)), which provides the contribution from adjacent and co-channel interferences. The total MSE is shown in equation (14)

TOTAL−MSE=MMSE(DFE)+MSE($D_I$) (14)

This antenna selection algorithm is very efficient because signal strength is measured very quickly (a single register pair must be read from the demodulator), and SQM measurements that take longer to obtain are only taken in the immediate vicinity of the best signal strength.

The invention has been described in terms of exemplary embodiments. It is contemplated, however, that it may be practiced as described above with variations within the scope of the following claims.

The invention claimed is:

1. A method for controlling a plurality of antennas, each of the plurality of antennas configured to receive a radio frequency (RF) signal from a respectively different direction, the method comprising the steps of:

receiving the RF signal from the plurality of antennas, to receive the RF signal from multiple directions;

determining information concerning respective frequency spectra of the RF signal received from each of the multiple directions;

determining information concerning respective signal strengths of the RF signal received from each of the multiple directions;

analyzing the determined information concerning the respective signal strengths and the information concerning the respective frequency spectra of the RF signals to select a preferred direction of the multiple directions from which to receive the RF signal; and sending a direction control signal to the plurality of antennas such that signals from at least two of the plurality of antennas are combined to receive the RF signal from the preferred direction.

2. A method according to claim 1, wherein the information concerning the respective signal strengths of the RF signals is a signal strength metric defined by the following equation:

$$\text{Signal Strength} = 100 \times \left(1 - \frac{G}{G_{max}}\right)$$

where G represents an amount of amplification provided to the RF signal by an automatic gain control (AGC) amplifier and $G_{max}$ represents a maximum amount of amplification provided by the AGC amplifier.

3. A method according to claim 1, wherein the information concerning respective frequency spectra of the RF signal includes performance metrics for a decision feedback equalizer (DFE) applied to the RF signal received from respective ones of the multiple directions.

4. A method according to claim 3, wherein the performance metric is a measure of minimum mean squared error (MMSE) for the DFE.

5. A method according to claim 4, wherein the performance metric is an approximation of the MMSE of the DFE represented by the equation:

$$MMSE(DFE) \approx \sigma_s^2 G \exp\left(\frac{\delta}{2\pi} \sum_k \ln\left(\frac{\lambda}{P_k}\right)\right)$$

where $\sigma_s^2$ is the source signal power, G is an measure of amplification applied to the signal, $\lambda = \sigma_n^2/\sigma_s^2$, where $\sigma_n^2$ is the noise power, $\delta$ is a differential frequency that defines a frequency band and $P_k$ is a measure of signal power in the $k^{th}$ frequency band.

6. A method according to claim 4, wherein the performance metric is an approximation of the MMSE of the DFE represented by the equation:

$$MMSE(DFE) = \sigma_s^2 \frac{\sum_k |h_{\min_k}|^2}{\lambda \sum_k |h_k|^2 + 1}$$

where $\sigma_s^2$ is the source signal power, $\lambda = \sigma_n^2/\sigma_s^2$, where $\sigma_n^2$ is the noise power, $h_k$ is the $k^{th}$ term in a channel multipath error model, $h_{\min_k}$ is a $k^{th}$ tap coefficient of a decision feedback equalizer that minimizes the mean squared error between the equalized signal and a known reference signal.

7. A method according to claim 1, wherein the information concerning respective frequency spectra of the RF signal includes performance metrics for a linear equalizer (LE) applied to the RF signal received from respective ones of the multiple directions.

8. A method according to claim 7, wherein the performance metric is a measure of minimum mean squared error (MMSE) for the LE.

9. A method according to claim 8, wherein the performance metric is an approximation of the MMSE of the LE represented by the equation:

$$MMSE(LE) \approx \frac{\sigma_n^2 G \delta}{2\pi} \sum_k \frac{1}{P_k}$$

where $\sigma_n^2$ is the noise power, G is a measure of amplification applied to the signal, $\delta$ is a differential frequency that defines a frequency band and $P_k$ is a measure of signal power in the $k^{th}$ frequency band.

10. A method according to claim 8, wherein the performance metric is an approximation of the MMSE of the LE represented by the equations:

$$MMSE(LE) \approx \frac{\sigma_n^2 G \delta}{2\pi} \sum_k (\bar{P} - \tilde{P}_k)$$

$$\bar{P} = \frac{1}{N} \sum_k P_k, \quad \tilde{P}_k = P_k - \bar{P}$$

where $\sigma_n^2$ is the noise power, G is a measure of amplification applied to the signal, $\delta$ is a differential frequency that defines a frequency band, N is a number of frequency bands and $P_k$ is a measure of signal power in the $k^{th}$ frequency band.

11. A method according to claim 1, wherein the information concerning respective frequency spectra of the RF signal includes a respective spectral flatness metric for the RF signal received from each of the multiple directions.

12. A method according to claim 11, wherein the spectral flatness metric, SP, is represented by the equation:

$$SP = \log\left(\frac{1}{2\pi}\int_{-\pi}^{+\pi} Q'(f)df\right) - \frac{1}{2\pi}\int_{-\pi}^{+\pi} \log Q'(f)df$$

where $Q'(f) = |h_{min}(f)|^2 Q(f)$, $h_{min}(f)$ is the response of the equalization filter at frequency f and Q(f) is the power spectrum of the RF signal.

13. A method according to claim 1, wherein the information concerning the respective frequency spectra of the RF signal includes an interference degradation metric for the RF signal received from each of the multiple directions.

14. A method according to claim 13, wherein the interference degradation metric is represented by the equation $$MSE(D_I) \approx 10^{(A_T - D_I)/10}$$

where MSE is the mean squared error, $D_I$ is an estimate of the interference at a frequency $f_I$, $A_T 10 \log_{10}(MSE(D_T)) + D_T$ is a typical interference suppression value and $D_T$ is a desired to undesired ratio interference value.

15. A method for controlling a plurality of antennas, each of the plurality of antennas configured to receive a radio frequency (RF) signal from a respectively different direction, the method comprising the steps of:

receiving the RF signals from the plurality of antennas, to receive the RF signal from multiple directions;

measuring at least a first characteristic of the RF signal received from each of the multiple directions;

selecting one of the multiple directions responsive to the measured first characteristic to define a selected direction;

providing further direction signals to the plurality of antennas to receive the RF signal from respective further directions related to the selected direction;

measuring at least a second characteristic, different from the first characteristic, of the RF signal received from each of the further directions to select a preferred direction from which to receive the RF signal; and sending a direction control signal to the plurality of antennas such that signals from at least two of the plurality of antennas are combined to receive the RF signal from the preferred direction.

16. A method according to claim 15, wherein the first and second characteristics of the RF signal are respectively different channel quality metrics.

17. A method according to claim 15, wherein the first characteristic of the RF signal is selected from a group consisting of a power level of the RF signal, a minimum mean squared error (MMSE) of a decision feedback equalizer (DFE), a MMSE of a linear equalizer (LE), a spectral flatness metric and an interference degradation metric and the second characteristic of the RF signal is selected from a group consisting of a minimum mean squared error (MMSE) of a decision feedback equalizer (DFE), a MMSE of a linear equalizer (LE), a spectral flatness metric and an interference degradation metric.

18. A method according to claim 15, wherein receiving the RF signal from the multiple directions includes providing multiple direction signals to the plurality of antennas that cause the plurality of antennas to receive RF signals from at least two different directions and the further direction signals cause the plurality of antennas to receive RF signals from a further plurality of direction angles proximate to the selected direction.

19. A method according to claim 18, wherein the multiple direction signals include four cardinal directions, North, East, South and West, and the further direction signals include at least direction angles between the selected direction and each of the adjacent directions.

20. Apparatus comprising:

a plurality of antennas, responsive to a direction control signal for receiving a radio frequency (RF) signal preferentially from a direction indicated by the direction control signal;

a controller which provides multiple direction control signals to the plurality of antennas to receive the RF signal from multiple directions;

a power spectrum measurement processor which determines information concerning respective frequency spectra of the RF signal received from each of the multiple directions;

an automatic gain control circuit which provides respective measures of signal strength for the RF signal received from each of the multiple directions;

a processor which analyzes the determined information and the measures of signal strength to select a preferred direction of the multiple directions from which to receive the RF signal;

wherein the preferred direction control signal is sent to the plurality of antennas such that signals from at least two of the plurality of antennas are combined to receive the RF signal from the preferred direction.

21. Apparatus according to claim 20, further comprising an equalization filter which provides, to the processor, a respective measure of equalization error for the RF signals received from each of the multiple directions.

22. Apparatus according to claim 21, wherein the equalization filter is a decision feedback equalizer.

23. Apparatus according to claim 21, wherein the equalization filter is a linear equalizer.

* * * * *